(12) United States Patent
Watts et al.

(10) Patent No.: US 6,559,971 B1
(45) Date of Patent: May 6, 2003

(54) SELF-RESIZING DEMONSTRATION PAGE FOR A PRINTING DEVICE

(75) Inventors: Brian L. Watts, Boise, ID (US); Kristen K. Barrash, Boise, ID (US)

(73) Assignee: Hewlett-Packard Development Co., L.P., Houston, TX (US)

( * ) Notice: Subject to any disclaimer, the term of this patent is extended or adjusted under 35 U.S.C. 154(b) by 0 days.

(21) Appl. No.: 09/181,032

(22) Filed: Oct. 27, 1998

(51) Int. Cl.⁷ .............................................. G06K 45/00
(52) U.S. Cl. ......................................... 358/1.2; 358/1.9
(58) Field of Search .......................... 358/1.2, 1.9, 400, 358/401, 451, 471

(56) References Cited

U.S. PATENT DOCUMENTS

| | | | | |
|---|---|---|---|---|
| 4,688,181 A | * | 8/1987 | Cotrell et al. | 364/521 |
| 5,123,062 A | * | 6/1992 | Sangu | 382/57 |
| 5,905,530 A | * | 5/1999 | Yokota | 348/240 |
| 6,175,352 B1 | * | 1/2001 | Kay et al. | 345/100 |
| 6,222,635 B1 | * | 4/2001 | Gotoh | 358/1.15 |
| 6,281,979 B1 | * | 8/2001 | Atobe | 358/1.11 |
| 6,313,822 B1 | * | 11/2001 | McKay | 245/132 |

FOREIGN PATENT DOCUMENTS

| | | | | |
|---|---|---|---|---|
| EP | 0112414 | * | 4/1984 | G06F/3/023 |
| EP | 0281695 | * | 9/1988 | G06F/15/70 |
| JP | 09-327946 | | 12/1997 | |
| JP | 10-299489 | | 8/1998 | |

OTHER PUBLICATIONS

German Office Action dated May 15, 2000; Applicant: Hewlett–Packard; German Application No. 19944504.4.53; 3 pages.
English Translation of German Office Action dated May 15, 2000 ); Applicant: Hewlett–Packard; German Application No. 19944504.4.53; 2 pages.
English Abstract of Japanese Patent 09–327946; 1 page.
English Abstract of Japanese Patent 10–229489 1 page.

* cited by examiner

*Primary Examiner*—Jerome Grant, II
(74) *Attorney, Agent, or Firm*—Lane R. Simmons

(57) ABSTRACT

A demonstration page automatically resizes itself to fit a preferred media size of a printing device on which the demonstration page is printed. The demonstration page image is embedded in a printer control language (or page description language) to enable the automatic resizing of the image. The demonstration page omits control language commands that would otherwise override the preferred media size. Thus, the preferred media size stored in the printing device is used by the demonstration page for resizing and printing purposes. The demonstration page includes control language that identifies an original media size associated with the stored image and further includes control language that calculates scale factors for resizing the image to best fit the preferred media size.

35 Claims, 3 Drawing Sheets

LETTER

LEGAL

A4

DEMONSTRATION PAGE DATA

SELF-RESIZING DEMONSTRATION PAGE FOR A PRINTING DEVICE

FIELD OF THE INVENTION

This invention relates in general to image forming devices and, more particularly, to a demonstration page image which automatically resizes itself to fit a preferred paper size in a printing device.

BACKGROUND OF THE INVENTION

In printing devices, such as laser printers, ink jet printers, facsimile machines, digital copiers and the like, it is common in the art to enable the printing device to print a demonstration (demo) page. Typically, the demonstration page is an image that includes text, graphic images, and color (if available) to help a consumer visually inspect the print quality of the printing device prior to purchasing the device. Generally, the demonstration page resides in a memory, such as a read-only memory (ROM), disposed either internal or external to the printing device. The demonstration page is read from ROM and is output by the printing device onto a sheet of media upon demand by a user. The printing of the demonstration page is initiated by the user at the control panel of the printer by pressing certain button configurations or selecting a particular menu option, or via a separate/external control device that is connected to the printer (and that may in fact hold the demonstration page).

One concern associated with demonstration pages is that in today's graphic and color intensive market, the demonstration page data often requires a significant amount of memory space. For example, a graphic intensive color image may easily consume 1.4 megabytes (MB) of memory. Although memory prices have declined in recent years, memory is still a cost factor in today's competitive consumer product marketplace, especially in low-end products. Thus, it is preferable to minimize the amount of memory that must be dedicated to the storing of a demonstration page image.

Typically, a size-specific demonstration page image must be generated and stored in memory for each size of media that is to be demonstrated (printed) by the device. For example, if a given laser printer is expected to print on demonstration sizes of letter, legal and A4 size media, then the demonstration page image must actually be stored in memory as three separate images—one to fit the letter size media, one to fit the legal size and one to fit the A4 size media—if the demonstration page image is to print out on each size of media with a best fit. Storing three (in this example) separate respectively sized images ensures that the demonstration page will look its best (have a best-fit appearance) regardless of the size of media being used in the printer at the time the demonstration page is printed.

Conventionally, a single demonstration page image stored in ROM simply does not and cannot fit (or fully occupy) all of the different media sizes onto which the image may be printed. To further clarify, if a single "letter" size/format demonstration page image is stored in ROM, but A4 is the default or preferred media size configuration of the printer, then the resultant "letter" sized demonstration image that is printed on the A4 output sheet will not "fit" as well as it could or should. Specifically, in this example, white non-imaged borders will vary in size around the "letter" sized image printed on the A4 size media.

Thus, it is not uncommon for a printing device to include multiple demonstration page images in ROM, corresponding to the multiple media sizes that are usable by the printer, to enable best-fit printing of the demonstration page image onto whichever size of media is currently being used by the printer. However, obviously, storing multiple images is memory intensive and costly. For example, if three separate 1.4 MB demonstration page images are stored in ROM, then a total of 4.2 MB of memory is needed. Clearly, this increased memory requirement is undesirable when cost issues are competitively critical.

Accordingly, an object of the present invention is to enable a single demonstration page image that automatically resizes itself to best-fit any given preferred media size of a printing device.

SUMMARY OF THE INVENTION

According to principles of the present invention in a preferred embodiment, a demonstration page automatically resizes itself to fit a preferred media size of a printing device on which the demonstration page is printed. The demonstration page image is embedded in a printer control language (or page description language) such as PostScript to enable automatic resizing of the image. The demonstration page omits control language commands that would otherwise override the preferred media size. Thus, the preferred media size stored in the printing device is used by the demonstration page for resizing and printing purposes. The demonstration page includes control language that identifies an original media size associated with the stored image and further includes control language that calculates scale factors for resizing the image to best fit the preferred media size (or at least a printable area of the preferred media size).

According to further principles, an imaging device includes: demonstration page image data stored in a memory operatively coupled to the imaging device, the image data defining an image having a predefined media size for imaging on the imaging device; and, control indicia stored in association with the image data for automatically resizing the image relative to its predefined media size to fit a preferred media size of the imaging device.

According to yet further principles, a method of imaging includes: storing a preferred media size for an imaging device in a memory operatively coupled to the imaging device; and, providing control indicia and demonstration page image data to the imaging device, wherein the control indicia automatically resizes the image data to fit the preferred media size.

Other objects, advantages, and capabilities of the present invention will become more apparent as the description proceeds.

DETAILED DESCRIPTION OF THE INVENTION

Figure 1:
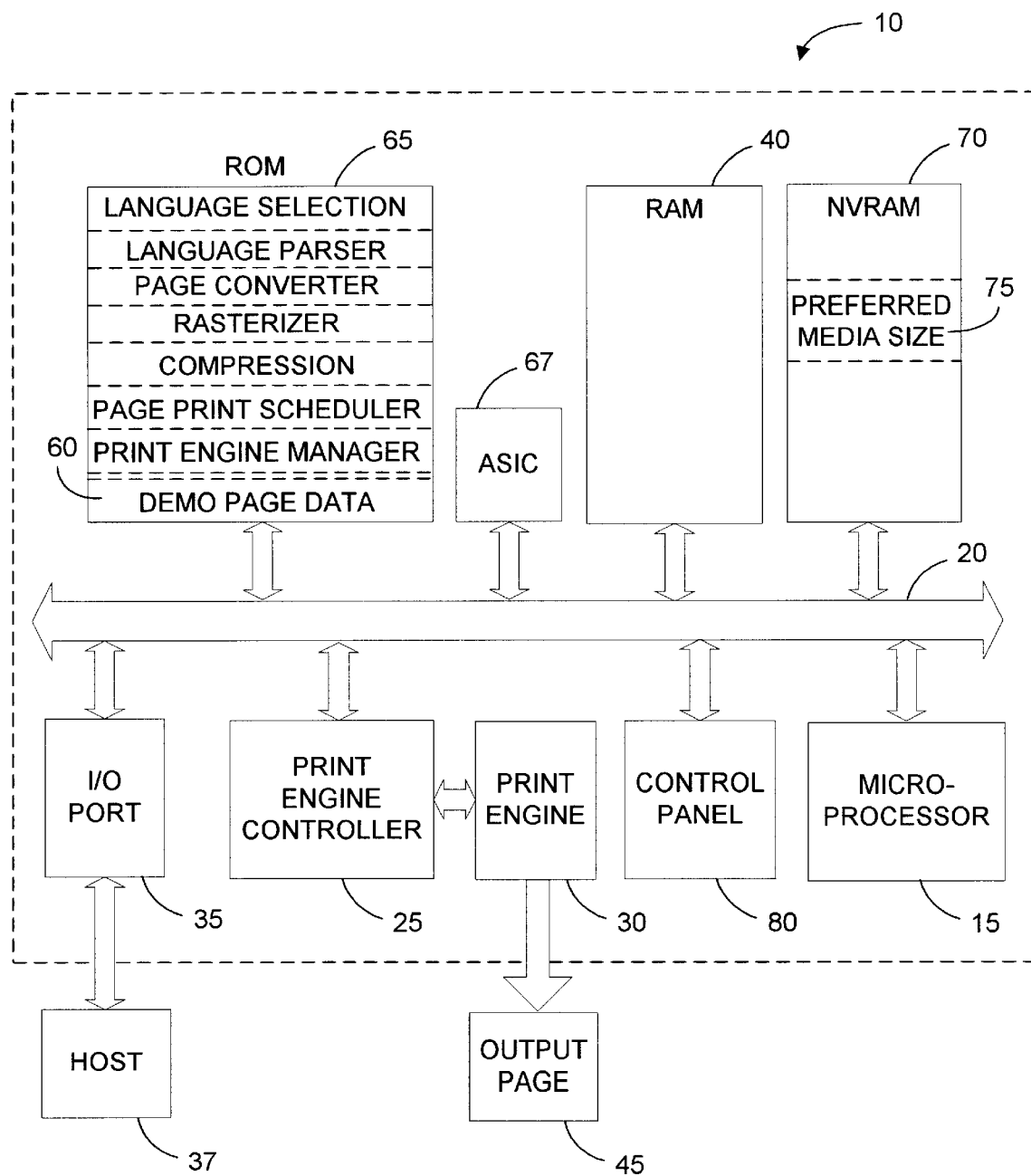
FIG. 1 is a block diagram of a laser printer employing one embodiment of the present invention self-resizing demonstration page image.

FIG. 1 is a high level block diagram of a page printer 10 incorporating one embodiment of the present invention self-resizing demonstration page for enabling a best-fit onto a preferred media of printer 10. Page printer 10 is controlled by a microprocessor 15 which communicates with other elements of the system via bus 20. A print engine controller 25 and associated print engine 30 connect to bus 20 and provide the print output capability for the page printer. Output page 45 is printed from engine 30. Print engine 30 is preferably a laser printer that employs an electrophotographic drum imaging system as well known in the art. However, as will be obvious to those of ordinary skill in the art, the present invention is similarly applicable to other types of printers and/or imaging devices such as digital copiers, facsimile devices, ink jet printers and the like.

An input/output (I/O) port 35 provides communications between page printer 10 and host computer 37, and receives page descriptions from the host for processing within page printer 10. A dynamic random access memory (RAM) 40 provides a main memory for the page printer. For purposes of discussion herein, RAM 40 is representative of a general purpose memory and/or a cache memory associated with processor 15, both as well known in the art. During a print job, RAM 40 stores rasterized image data prior to being output by print engine 30.

A read-only memory (ROM) 65 holds firmware which controls the operation of microprocessor 15 and page printer 10. Although the firmware routines are discussed in reference to being stored in ROM 65, it is understood that their functionality may likewise be implemented in ASIC 67 if so desired. The routines (code procedures) stored in ROM 65 may include the following: a language selection routine, language parser routine, page converter, rasterizer, compression code, page print scheduler, and print engine manager. The language selection routine determines and identifies which printer description language (i.e., printer job language, printer control language, or page description language), such as PJL, PCL, PostScript, etc., is being processed for any given print job. The language parser parses the identified printer language to enable the particular job at hand to be executed (or interpreted) and printed. The page converter firmware converts a page description received from the host to a display command list wherein each display command defines an object to be printed on the page. The rasterizer firmware converts the display commands to appropriate bit maps, divides a page into logical bands (or strips), and distributes the bit maps (or rasterized bands/strips) into memory 40. The compression firmware compresses the rasterized bands or other data as necessary. Each of these routines may be conventional in the art.

Importantly, ROM 65 further includes demonstration page data 60 according to the present invention. Demonstration page data 60 includes image data (i.e., encoded binary) and/or text embedded in a printer control language (or a page description language). The printer control language controls the actual printing of the image data and/or text (hereinafter referred to jointly and/or separately as image data for ease of discussion purposes). In a preferred embodiment, the printer page description language is the well known Adobe PostScript language. Under principles of the present invention, the specific implementation of demonstration page data 60 in PostScript enables the image data to automatically be resized to fit a preferred media size defined in printer 10. To this regard, non-volatile RAM (NVRAM) 70 includes preferred media size/data 75 which defines a preferred or default size of media to be used by printer 10. Preferred media data 75 is stored in NVRAM 70 in response to the input of key configurations or menu option selections at control panel 80 of printer 10 by a user. Alternatively, preferred media data 75 is read from ROM 65 into NVRAM 70 upon system initialization. In either case, the actual storing of preferred media data 75 into NVRAM 70 occurs as may be conventional in the art.

It should be noted here that although demonstration page data 60 is shown as being stored in ROM 65, under principles of the present invention it is similarly feasible for it to be stored in other types of storage devices, such as a flash memory module. Additionally, demonstration page data 60 may be stored in a memory device that is external to printer 10. For example, it may be stored in a memory associated with host 37 whereby it is downloaded to printer 10 via a conventional network, a direct connect, or some other communication means (such as infrared) and via I/O port 35. Alternatively, demonstration page data 60 may be stored in an external demonstration control device that also enables the transfer of the page data 60 to printer 10 via I/O port 35. In any case, whether demo data 60 is stored in a memory 65 internal to printer 10, or whether it is stored in a memory (i.e., host 37 or other device) that is external to printer 10, it is understood that the memory is operatively coupled to printer 10 and that the demonstration page data 60 is operatively available to printer 10 to enable the demonstration page image to be printed as output page 45.

In further reference to the operation of printer 10, when a page is closed for processing (i.e., all bands or strips of the page have been evaluated, rasterized, compressed, etc. for processing by print engine 30) then the rasterized bands are stored in turn to certain pre-allocated video buffers (not shown). Subsequently, the bands are passed to print engine 30 by print engine controller 25 to enable the generation of an image (i.e., text/graphics etc). The page print scheduler controls the sequencing and transferring of bands to print engine controller 25. The print engine manager controls the operation of print engine controller 25 and, in turn, print engine 30.

Similarly, demonstration page data 60 is passed to the language selection routine, language parser, page converter, rasterizer, etc., and to print engine controller 25 and print engine 30 to produce output page 45. Importantly, however, the present invention demonstration page data automatically resizes itself to fit the preferred media size 75 for output page 45.

Figure 2:
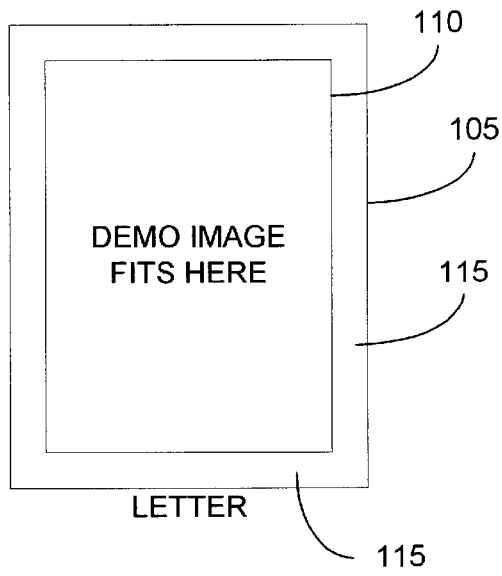
FIGS. 2–4 are schematic block diagrams representing variably sized demonstration pages printed according to one embodiment of the present invention.
Figure 3:
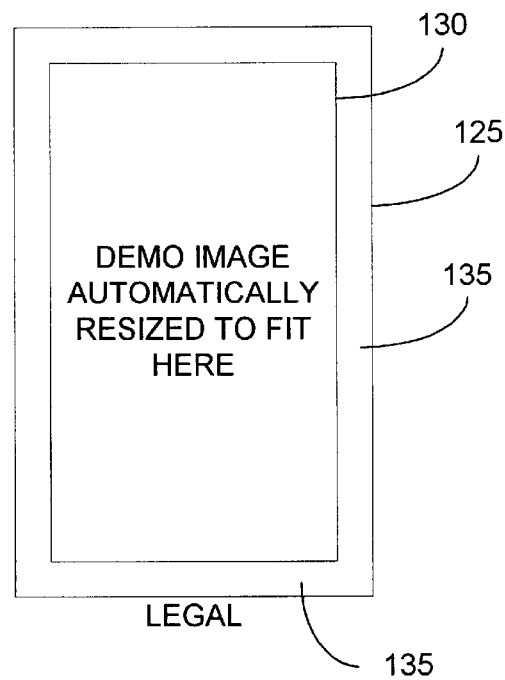
Figure 4:
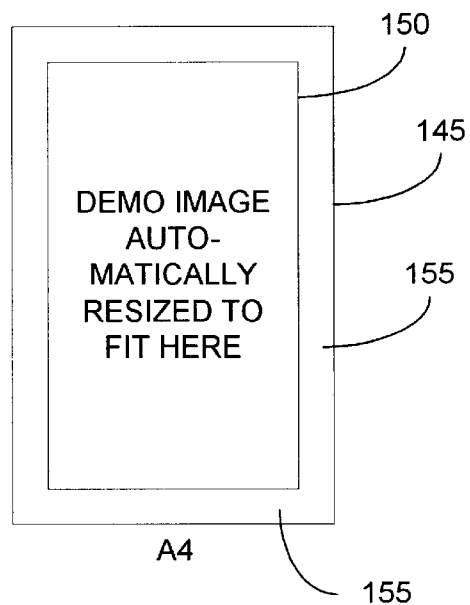

FIGS. 2–4 are schematic block diagrams representing demonstration page data 60 printed on variably sized media according to one embodiment of the present invention. FIG. 2 represents a "letter" size sheet of media 105 having demonstration page data/image 110 (60 of FIG. 1) printed thereon. Demonstration page image 110 is printed onto letter size media 105 with a natural or "best fit" because image 110 was created and stored in ROM 65 to "fit" a sheet of media having "letter" size dimensions, i.e., 8½ inches by 11 inches. For demonstration page purposes, it is often preferred to have image 110 be printed on substantially the entire media 105 (or at least on the entire printable area of media 105), or at least printed in a visually aesthetic manner in its occupancy of media 105. Thus, under the present invention and for purposes of discussion herein, when it is stated that an image "fits" the media size, it is meant that the image occupies substantially the entire media size, as shown in FIGS. 2–4. Alternatively, the image "fits" the output media size when it occupies a preferred area of that media that corresponds respectively to how the image occupies the media size for which the image was originally created (for best overall visual perception and aesthetics). Thus, as an example of a best fit, when image 110 is printed onto sheet 105 substantially equal non-imaged borders/areas 115 encompass the image 110. Or, in other words, the non-imaged borders/areas 115 are evenly spaced about image 110 on media 105. Now, obviously, the image 110 could have been created and stored such that the borders 115 would vary in size, but a preferred fit for this exemplary demonstration page occupies substantially the entire sheet 105 with evenly spaced borders 115.

It should be noted that since demonstration page image 110 was originally stored in ROM 65 (as demonstration page data 60) in a "letter" size format, no resizing is needed to enable a preferred fit printing onto letter size media 105. However, with respect to FIGS. 3–4, it should be noted that the demonstration page data/image 60 is automatically resized 130, 150 to fit those specific page size formats 125, 145 shown.

So, referring now to FIG. 3, a schematic block diagram represents a "legal" size sheet of media 125 having demonstration page data/image 130 (60 of FIG. 1) printed thereon. According to one embodiment under the present invention, demonstration page image 130 prints onto legal size media 125 with a natural or best fit. Notably, image 130 is printed on substantially the entire media 125 for a visually aesthetic result. To this regard, substantially equal non-imaged borders/areas 135 encompass the image 130. Thus, image 130 has been automatically resized (from its stored "letter" format 60 in ROM 65) to fit legal sized media 125. This auto- or self-resizing occurs when the demonstration page print process is initiated and when a preferred media size 75 is different than the internally stored size of demonstration page data 60. In this example, the preferred media size 75 was set to "legal".

In reference now to FIG. 4, this schematic block diagram represents an "A4" size sheet of media 145 having demonstration page data/image 150 (60 of FIG. 1) printed thereon. Again, according to one embodiment of the present invention, demonstration page image 150 prints onto this A4 size media 145 with a natural or best fit. Notably, image 150 is printed on substantially the entire media 145 for a visually aesthetic result, and substantially equal non-imaged borders/areas 155 encompass the image 150. Thus, image 150 has been automatically resized (from its stored "letter" format 60 in ROM 65) to fit A4 sized media 145. Again, this auto- or self-resizing occurs when the demonstration page print process is initiated and when a preferred media size 75 is different than the internally stored size of demonstration page data 60. Thus, in this example of FIG. 4, the preferred media size 75 was set to "A4".

Referencing both FIG. 3 and FIG. 4 now, it should also be noted that in these examples the images 130, 150 have been resized (relative to image 110 of FIG. 2) to "fit" their respective output media size such that each image 130, 150 occupies a preferred area of the media that corresponds respectively to how the original image 110 occupies the media size 105 for which the image/data 60 was originally created.

Figure 5:
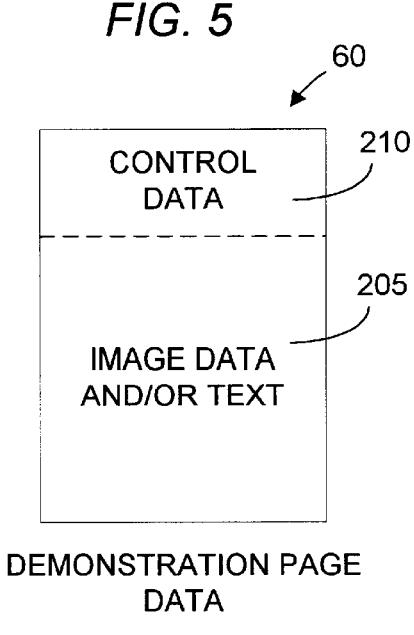
FIG. 5 is a schematic block diagram representing the self-resizing demonstration page data according to one embodiment of the present invention.

Referring now to FIG. 5, a schematic block diagram depicts in further detail a preferred embodiment of demonstration page data 60 according to the present invention. In a preferred embodiment, demonstration page data 60 is a PostScript file having embedded therein image data (such as encoded binary or vector data) and/or text 205 (again, referred to herein jointly as image data for ease of discussion purposes) and control data 210. Image data 205 defines the actual demonstration page image and/or text that is to be printed onto output page 45 (FIG. 1). Image data 205 also corresponds to demo image 110 of FIG. 2, image 130 of FIG. 3, and image 150 of FIG. 4. Control data 210 defines certain printing characteristics for image data 205 as defined in the PostScript language (in a preferred embodiment). For example, the following four lines of PostScript code define a preferred embodiment of the part of control data 210 that "fits" image data 205 to the preferred media size 75 defined in NVRAM 70:

(1) currentpagedevice/PageSize get 0 get/x_size exch def
(2) currentpagedevice/PageSize get 1 get/y_size exch def
(3) 12 dup y_size sub neg translate
(4) x_size 24 sub 588 div y_size 24 sub 768 div neg scale To explain, the first line (1) gets the width of the preferred media size 75, and the second line (2) gets the height of the preferred media size. Initially, the preferred media size 75 is read from NVRAM 70 and placed into the PostScript dictionary for this demonstration page 60 print job. It should be noted, particularly, that the particular PostScript command that generally accompanies a print job to specify a specific media size is expressly omitted from control data 210. In other words, in this example, the PostScript command "<</PageSize [612 792]>> setpagedevice" is expressly omitted from control data 210. This ensures that only the media size defined by the preferred media size 75 (and/or stored in the PostScript dictionary) is used for printing image data 205. Consequently, an automatic re-sizing is enabled for image data 205 to best fit the preferred (or default) media size 75 of printer 10.

The third line (3) moves the PostScript origin of the user coordinate system to the upper left corner of the printable area of the preferred media size. This is done because the image used on the demonstration page was created by a scanner that scanned the image top to bottom. PostScript's default coordinate system goes from bottom to top. That is, the image origin is in the upper left corner of the image but the default PostScript origin is in the lower left corner of the page. If this step was not performed (in connection with the "neg" command of line (4)), the image would be below the printable area and would not get put on the media/paper.

Importantly, the fourth line (4) calculates separate X and Y scale factors and uses them to scale the image up or down to fit the preferred media size 75. With separate scale factors, the aspect ratio of the image is lost and the image can appear distorted, but having separate scale factors allows substantially the entire printable area of the media to be filled or occupied. That is, the white non-imaged borders (i.e., 135, FIG. 3, and 155, FIG. 4) will be the same on the top, bottom, and sides of the paper. The X and Y scale factors are calculated as follows:

X Scale Factor=printable width of the preferred media 75 divided by the printable width of the demonstration page (defined as 588 for a "letter" size media in line 4).

Y Scale Factor=printable height of the preferred media 75 divided by the printable height of the demonstration page (defined as 768 for a "letter" size media in line 4).

If it is desired that the aspect ratio be kept, then the X and Y scale factors are not separated. However, more white non-imaged border will appear around the image on the output page (if the preferred media size differs from the demonstration page size), and/or the white borders may vary in size around the output page. In this context, the demonstration page image data 205 is still scaled, but only one scale factor is used to fit the preferred media size.

Alternatively, if both X and Y scale factors are set to the same value in order to keep the aspect ratio, then the image may simply be clipped to best fit the output page. In other words, the image is scaled while keeping the aspect ratio but the image is clipped to substantially fill or occupy the entire printable area of the preferred media.

Now, regardless of aspect ratio, examples of scale factors include: if the X scale factor is 1, then the resultant demonstration page image 205 that is printed onto output page 45 is not scaled in the X direction. If the X scale factor is 2, then the output page printed image is twice the original size in the X direction. If the X scale factor is 0.5, then the output image is half the original size in the X direction.

Figure 6:
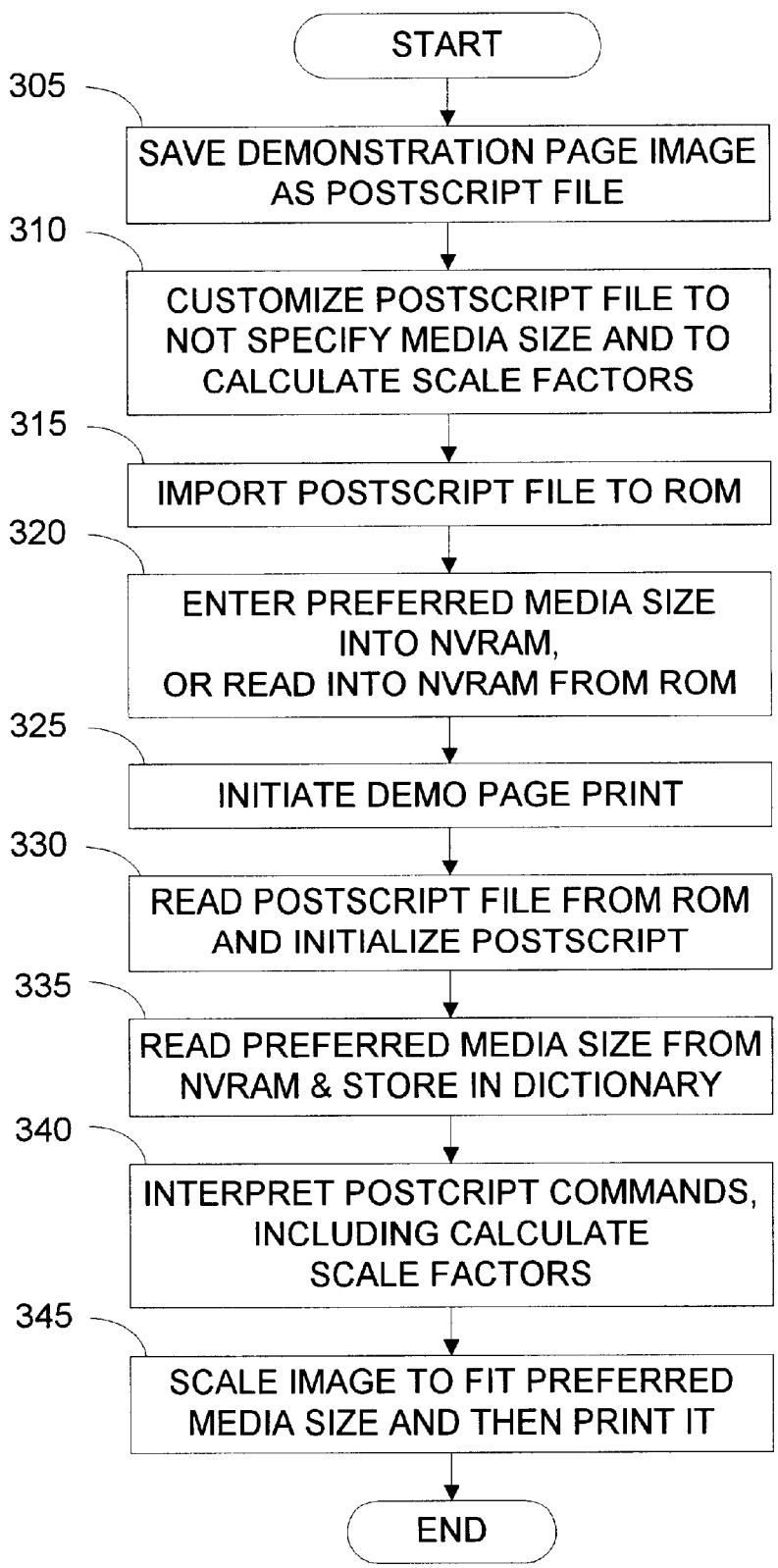
FIG. 6 is a flow chart depicting a preferred method according to one embodiment of the present invention.

Referring now to FIG. 6, a flow chart depicts a preferred method of the present invention for creating and processing a demonstration page that automatically resizes itself to fit a preferred media size of printer 10 upon printing of the demonstration page. First, 305, a demonstration page image 205 is embedded in a printer control language file 60. In a preferred embodiment, the image is embedded into a PostScript file. Next, 310, the PostScript file is customized 210 to not specify a media size. This allows a preferred or default media size 75 stored in the printer 10 to be utilized. Additionally, the PostScript file is modified 210 to calculate scale factors for the image 205 embedded therein. For example, if the image embedded is saved as a "letter" size image, then those respective dimensions are saved so that scale factors can be calculated relative thereto. Consequently, the scale factors are used to scale the image to fit a preferred media size 75 of the printer. Subsequently, the PostScript file 60 is stored 315 into the printer's ROM 65 or other non-volatile memory 70.

Next, a preferred media size is entered 320 into nonvolatile memory 70 of the printer (or read from ROM 65). Typically, a default/preferred media size is stored in ROM 65 as a default value, and that value is read and stored into NVRAM 70 upon each printer initialization. Subsequently, in the event a user wishes to manually override the ROM default media size value, a new preferred media size may be entered into NVRAM 70 via control panel 80. Additionally, a media tray may need to be setup or configured to reflect the preferred media size.

At this point, demonstration page 60 is simply waiting to be printed. So, once printer 10 initiates a printing 325 of demonstration page 60 (whether it is initiated by user input via control panel 80 or by some other method is inconsequential under the present invention), the demonstration page 60 is read from ROM 65 and the PostScript language parser is initialized 330. To this regard, the preferred media value 75 is read from NVRAM 70 and stored into the PostScript dictionary 335 for this demonstration page print job. Subsequently, the PostScript commands are interpreted 340, including calculating the X and Y Scale Factors for fitting the demonstration page image 205 to the preferred media size 75. Finally, 345, the demonstration page image 205 is scaled/resized (per the calculated scale factors) to fit the preferred media size 75, and then the image is printed.

In summary, the present invention provides a mechanism and method for automatically resizing a demonstration page image to fit a preferred media size in a printing device. It will be obvious to one of ordinary skill in the art that the present invention is easily implemented utilizing any of a variety of components and tools existing in the art. Moreover, while the present invention has been described by reference to specific embodiments, it will be apparent that other alternative embodiments and methods of implementation or modification may be employed without departing from the true spirit and scope of the invention.

What is claimed is:

1. An imaging device, comprising:
   (a) an imaging engine; and,
   (b) image data operatively available to the imaging engine, the image data having indicia for automatically resizing the image data to fit a preferred media size associated with the imaging device, the indicia including (i) no indicia that overrides the preferred media size, (ii) indicia indicative of a media size associated with the image data, and (iii) indicia for calculating scale factor indicia for resizing the image data to fit the preferred media size.

2. The imaging device of claim 1 wherein the imaging device is a printer, copier or facsimile device.

3. The imaging device of claim 1 wherein the image data includes a demonstration page image for the imaging device.

4. The imaging device of claim 1 wherein the indicia includes scale factor calculation means for calculating at least one scale factor for scaling the image data to fit the preferred media size such that substantially the entire preferred media size is utilized.

5. The imaging device of claim 1 wherein the indicia includes scale factor calculation means for scaling the image data to fit the preferred media size such that substantially equal non-imaged borders encompass the image data on the preferred media size.

6. The imaging device of claim 1 wherein the indicia includes scaling and clipping means for scaling and clipping the image data to fit the preferred media size.

7. The imaging device of claim 1 wherein the preferred media size is indicative of a media size onto which imaging is to occur in the imaging device unless otherwise controlled.

8. The imaging device of claim 1 wherein the indicia includes means for resizing the image data to fit the preferred media size such that the image data occupies an area of the preferred media size that corresponds respectively to an area that the image data occupies of a media size for which the image data was originally created.

9. The imaging device of claim 1 wherein the preferred media size is indicative of a default media size used by the imaging device during an imaging operation.

10. An imaging device, comprising:
    (a) an imaging engine;
    (b) memory operatively coupled to the imaging engine;
    (c) a preferred media size of the imaging device stored in the memory;
    (d) demonstration page data stored in the memory; and,
    (e) indicia stored in association with the demonstration page data for automatically resizing the demonstration page data to fit the preferred media size, wherein the indicia includes scaling and clipping indicia for scaling and clipping the demonstration page data to fit the preferred media size.

11. The imaging device of claim 10 wherein the imaging device is a printer, copier or facsimile device.

12. The imaging device of claim 10 wherein the indicia includes scale factor calculation indicia for calculating at least one scale factor for scaling the demonstration page data to fit the preferred media size such that substantially the entire preferred media size is occupied.

13. The imaging device of claim 10 wherein the preferred media size is indicative of a media size onto which imaging is to occur in the imaging device unless otherwise controlled.

14. The imaging device of claim 10 wherein the preferred media size is indicative of a default media size used by the imaging device during an imaging operation.

15. The imaging device of claim 10 wherein the indicia includes indicia for resizing the demonstration page data to fit the preferred media size such that the demonstration page data occupies an area of the preferred media size that corresponds respectively to an area that the demonstration page data occupies of a media size for which the demonstration page data was originally created.

16. An imaging device, comprising:
    (a) an imaging engine;
    (b) memory operatively coupled to the imaging engine;
    (c) a preferred media size of the imaging device stored in the memory;
    (d) demonstration page data stored in the memory; and,
    (e) indicia stored in association with the demonstration page data for automatically resizing the demonstration page data to fit the preferred media size, wherein the indicia includes scale factor calculation indicia for scaling the demonstration page data to fit the preferred media size such that substantially equal non-imaged borders encompass the demonstration page data on the preferred media size.

17. An imaging device, comprising:
    (a) an imaging engine;
    (b) memory operatively coupled to the imaging engine;
    (c) a preferred media size of the imaging device stored in the memory;
    (d) demonstration page data stored in the memory; and,
    (e) indicia stored in association with the demonstration page data for automatically resizing the demonstration page data to fit the preferred media size, wherein the indicia includes (i) no indicia that overrides the preferred media size, (ii) image data media size indicia indicative of a media size associated with the demonstration page data, and (iii) indicia for calculating scale factor indicia for resizing the demonstration page data from the image data media size to fit the preferred media size.

18. An imaging device, comprising:
    (a) image data stored in a memory operatively coupled to the imaging device, the image data defining an image having a predefined media size for imaging on the imaging device; and,
    (b) control indicia stored in association with the image data for automatically resizing the image relative to its predefined media size to fit a preferred media size of the imaging device, wherein the control indicia includes (i) no indicia that overrides the preferred media size, (ii) indicia indicative of the predefined media size, and (iii) indicia for calculating scale factor indicia for resizing the image data from the predefined media size to the preferred media size.

19. A self-resizing demonstration page, comprising:
    (a) image data having a predefined media size; and,
    (b) control indicia associated with the image data for automatically resizing the image data relative to the predefined media size to fit a preferred media size of an imaging device, the control indicia including (i) no indicia that overrides the preferred media size, (ii) indicia indicative of the predefined media size, and (iii) indicia for calculating scale factor indicia for resizing the image data from the predefined media size to the preferred media size.

20. A method of imaging, comprising:
    (a) providing control indicia in association with image data, the control indicia for automatically resizing the image data to fit a preferred media size of an imaging device such that the image data occupies an area of the preferred media size that corresponds respectively to an area that the image data occupies of a media size for which the image data was originally created; and,
    (b) providing the control indicia and image data to the imaging device for imaging thereof.

21. The method of claim 20 wherein the imaging device is a printer, copier or facsimile device.

22. The method of claim 20 wherein the control indicia includes scale factor calculation indicia for calculating at least one scale factor for scaling the image data to fit the preferred media size such that substantially the entire preferred media size is utilized.

23. The method of claim 20 wherein the preferred media size is indicative of a media size onto which imaging is to occur unless otherwise controlled.

24. The method of claim 20 wherein the preferred media size is indicative of a default media size used by the imaging device during an imaging operation.

25. A method of imaging, comprising:
    (a) providing control indicia in association with image data, the control indicia for automatically resizing the image data to fit a preferred media size of an imaging device, wherein the control indicia includes (i) no indicia that overrides the preferred media size, (ii) image data media size indicia indicative of a media size associated with the image data, and (iii) indicia for calculating scale factor indicia for resizing the image data from the image data media size to fit the preferred media size; and,
    (b) providing the control indicia and image data to the imaging device for imaging thereof.

26. A method of imaging, comprising:
    (a) providing control indicia in association with image data, the control indicia for automatically resizing the image data to fit a preferred media size of an imaging device, wherein the control indicia includes scale factor calculation indicia for scaling the image data to fit the preferred media size such that substantially equal non-imaged borders encompass the image data on the preferred media size; and,
    (b) providing the control indicia and image data to the imaging device for imaging thereof.

27. A method of imaging, comprising:
    (a) providing control indicia in association with image data, the control indicia for automatically resizing the image data to fit a preferred media size of an imaging device, wherein the indicia includes scaling and clipping indicia for scaling and clipping the image data to fit the preferred media size; and,
    (b) providing the control indicia and image data to the imaging device for imaging thereof.

28. A computer-readable medium having computer-executable instructions configured to enable image processing of image data on an imaging device, the image data associated with control indicia configured to automatically resize the image data to fit a default media size of the imaging device, wherein the control indicia includes (i) no indicia that overrides the default media size, (ii) image data media size indicia indicative of a media size associated with the image data, and (iii) indicia for calculating scale factor indicia for resizing the image data from the image data media size to fit the default media size.

29. A method of imaging on an imaging device, comprising:
    (a) detecting a preferred media size for the imaging device in a memory operatively couple to the imaging device; and, (b) providing control indicia and image data to the imaging device, the control indicia for automatically resizing the image data to fit the preferred media size, the control indicia including (i) no indicia that permanently overrides the preferred media size for imaging of the image data, (ii) image data media size indicia indicative of a media size associated with the image data, and (iii) indicia for calculating scale factor indicia for resizing the image data from the data media size to fit the preferred media size.

30. A computer-readable medium having image data configured for imaging on an imaging device, the image data associated with control indicia configured to automatically resize the image data to fit a preferred media size of the imaging device such that the image data occupies an area of the preferred media size that corresponds respectively to an area that the image data occupies of a media size for which the image data was originally created.

31. A computer-readable medium having image data configured for imaging on an imaging device, the image data associated with control indicia configured to automatically resize the image data to fit a preferred media size of the imaging device, wherein the control indicia includes scale factor calculation for scaling the image data to fit the preferred media size such that substantially equal non-imaged borders encompass the image data on the preferred media size.

32. A computer-readable medium having image data configured for imaging on an imaging device, the image data associated with control indicia configured to automatically resize the image data to fit a preferred media size of the imaging device, wherein the control indicia includes scaling and clipping indicia for scaling and clipping the image data to fit the preferred media size.

33. Self-resizing image data, comprising:

(a) first indicia indicative of a predefined media size for which the image data was originally created; and, (b) control indicia associated for automatically resizing the image data relative to the predefined media size to fit a preferred media size of an imaging device, the control indicia including scale factor calculation indicia for scaling the image data to fit the preferred media size such that substantially equal non-imaged borders encompass the image data on the preferred media size.

34. Self-resizing image data, comprising:

(a) first indicia indicative of a predefined media size for which the image data was originally created; and, (b) second indicia for automatically resizing the image data relative to the predefined media size to fit a preferred media size of an imaging device such that the image data occupies an area of the preferred media size that corresponds respectively to an area that the image data occupies of the predefined media size.

35. Self-resizing image data, comprising:

(a) first indicia indicative of a predefined media size for which the image data was originally created; and, (b) second indicia for automatically resizing the image data relative to the predefined media size to fit a preferred media size of an imaging device, wherein the second indicia includes scaling and clipping indicia for scaling and clipping the image data to fit the preferred media size.

* * * * *